D. Fisher.
Tube Clamp.
No. 3,605.
Reissued Aug. 17, 1869.
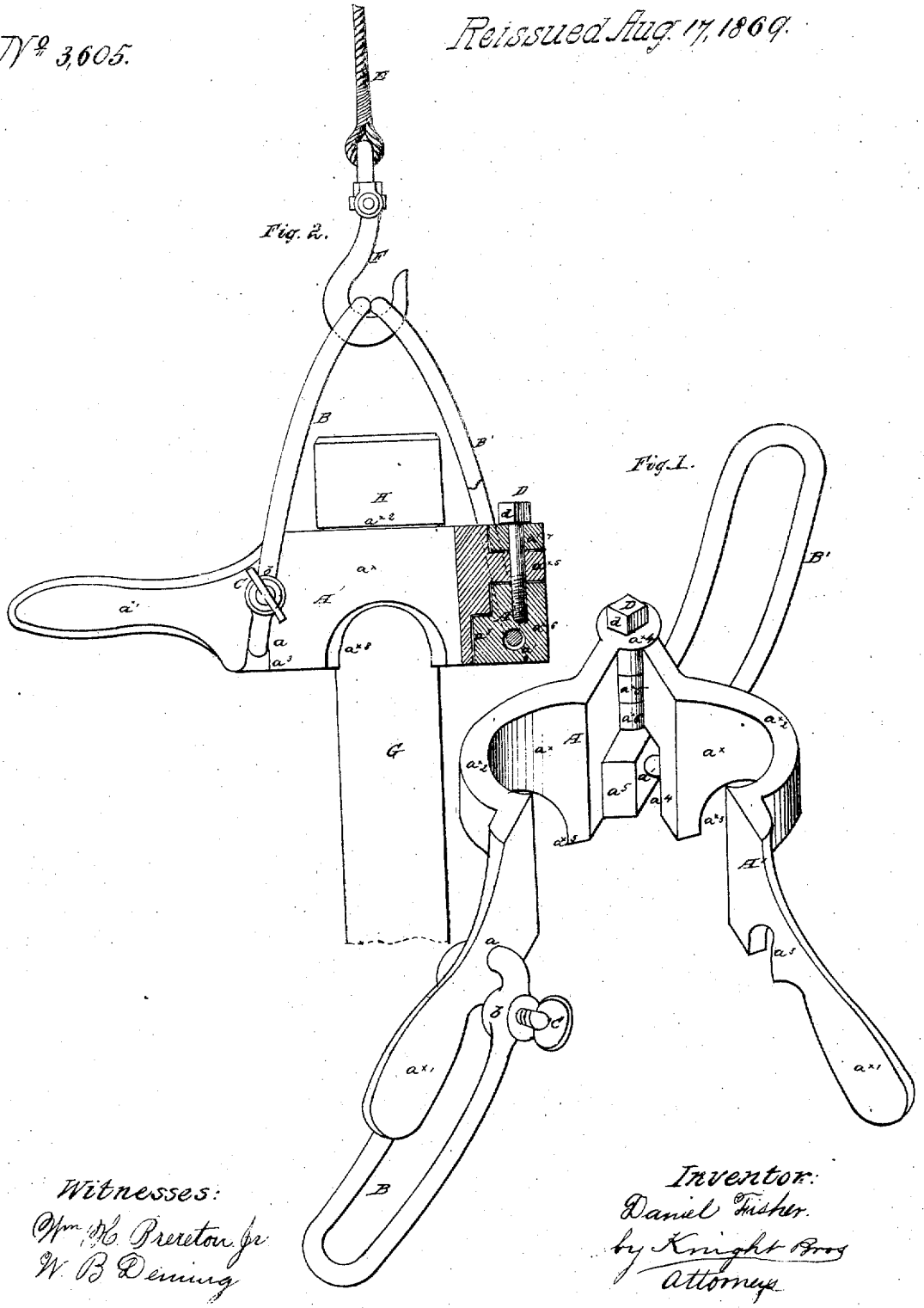
Witnesses:
Wm. H. Preston Jr.
W. B. Deming
Inventor:
Daniel Fisher.
by Knight Bros
Attorneys

UNITED STATES PATENT OFFICE.

DANIEL FISHER, OF OIL CITY, PENNSYLVANIA.

IMPROVEMENT IN CLAMPS FOR ELEVATING WELL-TUBES.

Specification forming part of Letters Patent No. 87,097, dated February 23, 1869; Reissue No. 3,605, dated August 17, 1869.

*To all whom it may concern:*

Be it known that I, DANIEL FISHER, of Oil City, in the county of Venango and State of Pennsylvania, have invented a new and useful Combined Clamp and Drawer for Well-Tubing; and I do hereby declare the following to be a full, clear, and exact description thereof, reference being had to the accompanying drawings, which are made a part of this specification.

The subject of my invention is a novel and simple device for facilitating the construction of tube-wells, combining the separate functions of the "clamp" and "drawer."

It consists of a hinged clamp adapted to grasp the tube under its thimble or sleeve, and having attached to it a pair of links for its attachment to the rope of the elevating or lowering apparatus, said links, when in the position in which they are held by their attachment to said suspending-rope, also serving to lock the clamp in its closed condition. One of the links is provided with a set-screw, by which it is adapted to be held in its upright position when detached from the rope, in order to maintain the clamp in its closed condition while coupling and uncoupling tubes.

In the drawings, Figure 1 is a perspective view of the device in an open and detached condition. Fig. 2 is an elevation thereof, partly in section, illustrating the manner of applying it to the tubing.

A A′ may represent the two jaws which constitute the clamp, and which may be made of malleable iron or other suitable material, of substantially the form represented in Fig. 1, and hereinafter more particularly referred to.

B B′ are the suspending-links, which are preferably of curved form to enable them to meet over the end of the tubing, as represented in Fig. 2, where the tubing is shown in red. They may be made of wrought-iron in the usual manner. They are connected to the clamp by means of the holes *a a′* in the lower edge of the jaw A, and when in their elevated position embrace the sides of both jaws and hold them tightly in their closed position, thus forming a strong, simple, and very secure fastening.

A set-screw, C, passing through an enlargement *b* of the link B, adapts said link to be held in an elevated position, so as to lock the clamp when it is detached from the rope, as in coupling and uncoupling the tubes.

The jaws A A′ are each made with a semi-tubular portion, $a^*$, to enable them conjointly to encircle the tube, and with handles $a^{*\prime}$, by which to hold the tube from turning while another is being screwed on. The upper edge, $a^{*2}$, of the portion $a^*$ is made straight or horizontal, to form a suitable bearing for the collar of the tube, as represented. Its under side, $a^{*3}$, may be concave, as represented, or have any other desired form. The jaws are hinged preferably only at their upper part, as represented, the hinge being composed of the perforated lugs $a^{*4}$ $a^{*5}$, cast on the jaws A and A′, respectively, and united by a tap-bolt, D, provided with the customary angular head *d*, and taking into a correspondingly-threaded socket in the lug $a^{*6}$ of the jaw A, the object being to form a secure and tight hinge without extending the pintle entirely through the hinge. The jaw A′ is recessed at $a^3$ and $a^4$ for the reception of the link B and the boss $a^5$ of A.

E represents the rope of the elevating or lowering apparatus, and F the customary swivel-hook attached thereto.

G represents the tube, and H the thimble or sleeve screwed on the end of the tube G to form the coupling.

The operation of the device is as follows: Two clamps, such as described, being used, as with the ordinary screw-swivel drawer, a length of tubing being attached, as represented in Fig. 2, its end is inserted in the hole and it is lowered until the clamp rests on the blocks at the surface of the ground. The hook F is then removed from the links of this clamp, and the second one, with another length of tubing, is attached and elevated, and its lower end is screwed into the thimble H of the first. An operator meanwhile grasps the handle $a^{*\prime}$ of the clamp and holds the tube from rotation while the other is being screwed in, the clamp being held closed by the link B, supported in its upright position by the screw C. The tubing, when the coupling is made, is raised a little and the lower clamp removed, when it is again lowered until the second clamp rests on the stop, when a third length of tubing, supported by means of the first clamp, is attached in like manner, and so on. In removing tubing the operation is substantially similar, and requires no further description.

The precise form of parts and combination of features shown and described is not essential to the operation of the individual parts, and may be modified as found preferable in practice. For example, the jaws engaging under the tube-thimble may be used without the clamping-screw C, and with any proper form and arrangement of the suspending-links.

Having thus described my invention, the following is what I claim as new therein and desire to secure by Letters Patent:

1. A tubing-drawer with jaws adapted to catch under a collar or thimble on the well-tube, all substantially as set forth.

2. The hinged jaws A A′ and suspending-links B B′, adapted to operate substantially as herein described.

3. In combination with the aforesaid jaws A A′ and links B B′, the clamping-screw C, employed substantially as and for the purpose set forth.

4. The pintle D *d*, in combination with the jaws A A′ and link B′, substantially as set forth.

DANIEL FISHER.

Witnesses:
JOHN CUMMING,
ALEXANDER CUMMING.